Aug. 17, 1937.    G. GARDNER    2,090,290
ROAD OIL MIXER AND DISTRIBUTOR
Filed Dec. 24, 1931    7 Sheets-Sheet 3

Aug. 17, 1937. G. GARDNER 2,090,290
ROAD OIL MIXER AND DISTRIBUTOR
Filed Dec. 24, 1931 7 Sheets-Sheet 5

Inventor
George Gardner
By Hazard and Miller
Attorneys

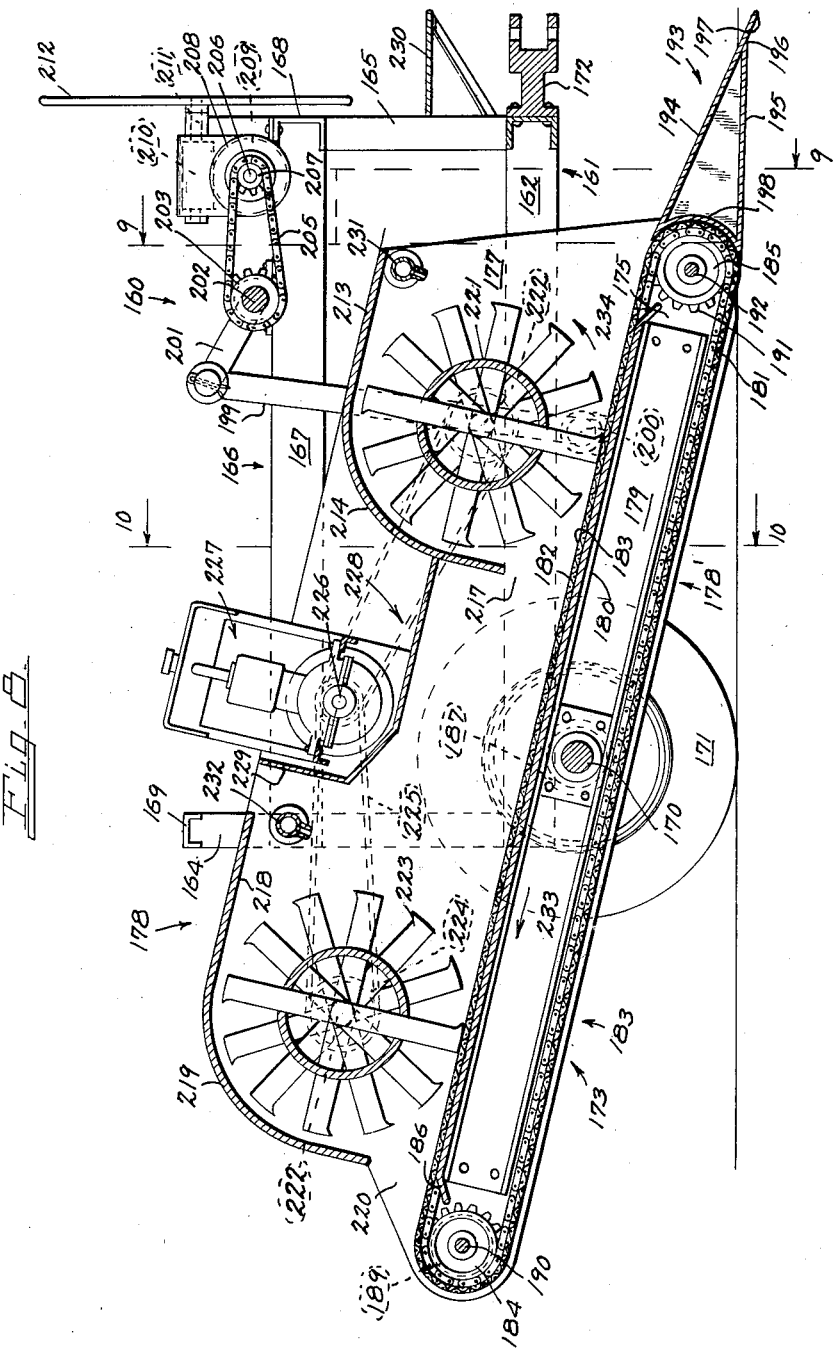

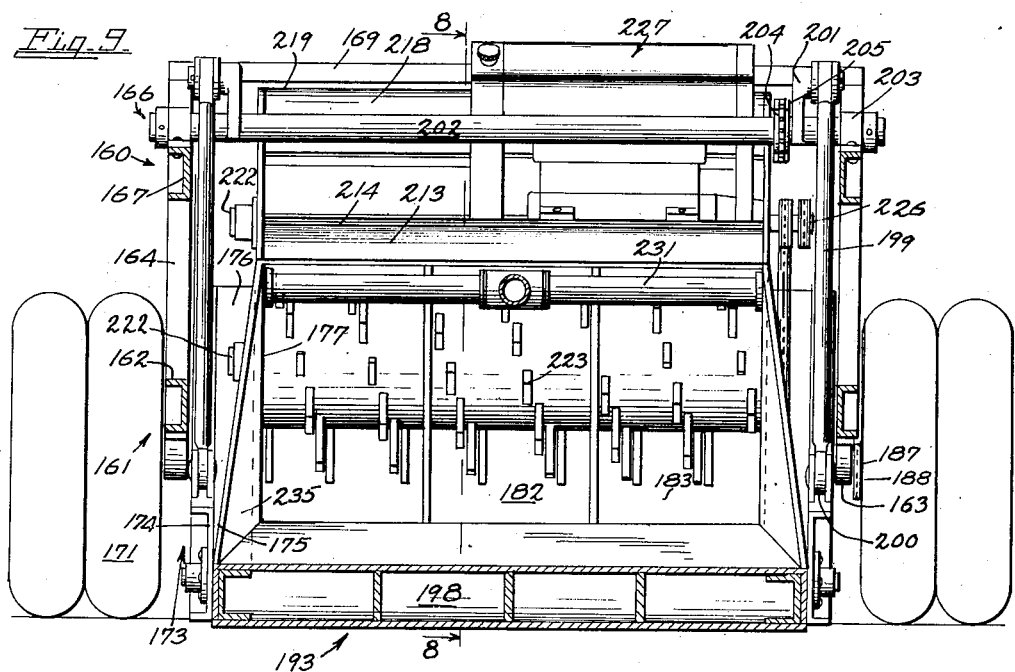
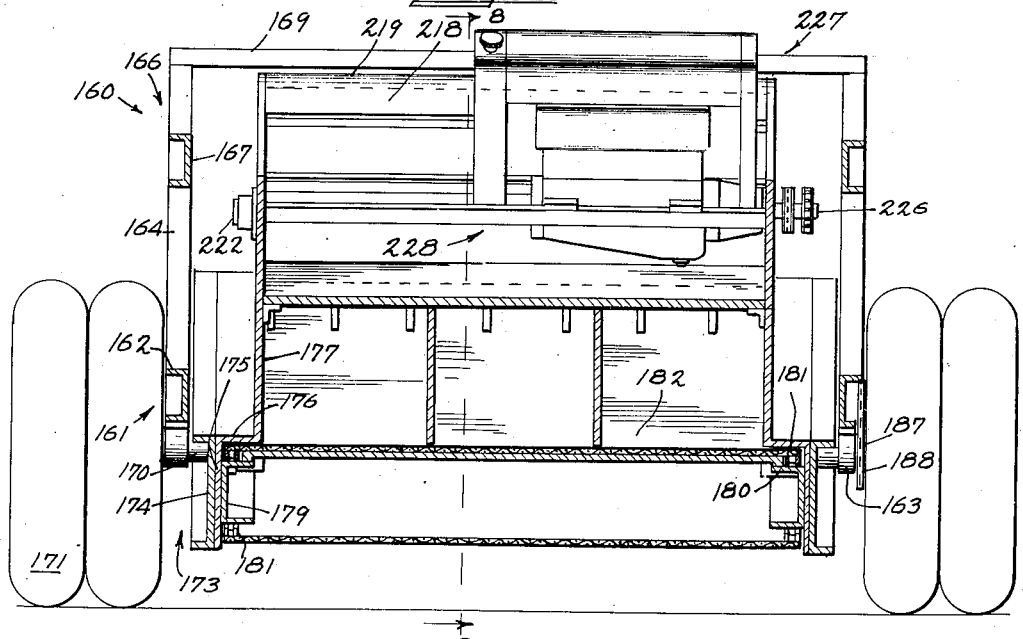

Patented Aug. 17, 1937

2,090,290

UNITED STATES PATENT OFFICE 2,090,290

ROAD OIL MIXER AND DISTRIBUTOR

George Gardner, Redlands, Calif.

Application December 24, 1931, Serial No. 583,024

60 Claims. (Cl. 94—44)

My present invention pertains to machines for mixing oil or asphalt-like products with an aggregate used for road making or surfacing in which the work is done in place in contra-distinction to the mixing being done at a plant and then the material hauled to the road.

My present invention may be considered as an improvement or further development of the road oil mixer of my patent application, Serial No. 549,289, filed July 7, 1931 matured to Patent No. 2,042,837, issued June 2, 1936.

These machines are of a type in which a plurality of rotating teeth or blades are driven by an engine or other source of power mounted on the machine while the machine is pulled in a forward direction over the road. The direction of rotation of the blades is such that those in contact with the road material are driven forwardly and thus continually drive the road material forward of the mixing blades, where such material piles into a more or less rolling mass and is carried rearwardly by the upward rearwardly moving ends of the blades and again deposited on the road surface after the mixing. The teeth are usually mounted in a spool or drum which is rotated and which allows the ready inserting and removal of the teeth.

Certain of the inventions of my present application consist in the manner of balancing a portion of the vehicle frame carrying the rotating spool with the teeth and the engine so that should the teeth meet obstructions causing considerable resistance to their movement the frame might tilt upwardly, thus elevating the spool over the obstruction without damage to the blades or the other parts of the machine. In this construction I utilize a vehicle frame and a supporting frame carried thereby with a single central pivot, preferably adjacent the rear axle, and this frame has the rotating spool with the blades operating between the front and rear axles with the engine mounted on the rear end of the supporting frame back of the rear axle. This frame is controlled to raise and lower the spool with the blades and to incline the spool for roads. In addition, a guide plate holds the supporting frame with the spool at right angles to the direction of travel.

Another feature of my invention comprises incorporating the oil or similar products in with the aggregates of the road material while these are undergoing a mixing by the rotating teeth on the spool. In order to effect this, I preferably mount an oil spray pipe forward of the spool so that as the aggregates are being driven forwardly and rolling in a mass through the action of the teeth that the oil may be sprayed into this mass of rolling and tumbling material.

Another detailed feature of my invention in this connection provides for swiveling the spray pipe. Also, I provide for metering the oil. The oil supply may be from a tank truck drawn beside the road oil mixer.

Other details of my invention as relates to the mixing provides the use of scour plates which are positioned longitudinally of the spool and prevent the teeth, which are arranged in a helical manner on the spool, from moving the road material toward one end of the spool and thus forming a windrow. These plates limit the lateral movement of the road material under action of the mixing teeth.

Another detailed feature comprises placing the teeth at an angle in the spool to the direction of rotation whereby one end of the tooth kicks the material laterally to the right and the other end laterally to the left.

Another detailed improvement includes securing wear plates on the lower front edge of the teeth.

Another feature of my invention is the use of a cutter and elevator which lifts the aggregate from the road surface to the mixing spool and mixing teeth and, hence, causes the mixing action to take place on material which is loosened from the road surface. This cutter and elevator, in one form of construction, may be a cross blade extending from one end of the spool housing to the other and adjustable as to elevation, which cuts or digs into and underneath the aggregate to the road surface and forces this upwardly so that as the teeth rotate in a forward direction over this blade they effect a mixing action of the aggregrates and the oil. In this feature of using the combined cutting and elevating blade, the mixed material flowing over the top of the spool and driven outwardly by the rotating teeth again fills in on a road bed which has been substantially cleared of the road surfacing material.

Another feature and development of my invention as relates to elevating the material to the mixers is providing a cutting blade and in conjunction therewith an endless conveyor which carries the road aggregates on its upper surface and moves these rearwardly in a proper relation to the forward speed of the vehicle carrying the mixer. Such speed should be designed so that the material, after mixing, is deposited in as thick a layer as before the mixing. Any section of the upper run of the moving conveyor may be considered as being relatively over the same section of the road.

Another feature of my invention in the use of the moving conveyor is having the mixer vehicle provided with two main wheels on the same axle and with a drive from this axle to the conveyor. The vehicle is preferably towed by a tractor secured directly to the forward end, or this forward end may be supported by a dolly and the dolly towed by a tractor. I provide adjustments for regulating the depth of cut, and also have control of the power drive of the mixing spools.

My invention is illustrated in connection with the accompanying drawings, in which:

Fig. 8 is a longitudinal section through a modified construction taken substantially on the line 8—8 of Figs. 9 and 10, showing the cutting blade with a moving conveyor forming the elevator;

Fig. 9 is a transverse section on the line 9—9 of Fig. 8 in the direction of the arrows;

Fig. 10 is a transverse section on the line 10—10 of Fig. 8 in the direction of the arrows with part of a cover plate omitted;

Fig. 11 is a detailed vertical transverse section on the line 11—11 of Fig. 5 in the direction of the arrows;

Fig. 12 is a detail showing the attachment of the wear plates to the mixing teeth.

Figure 1:
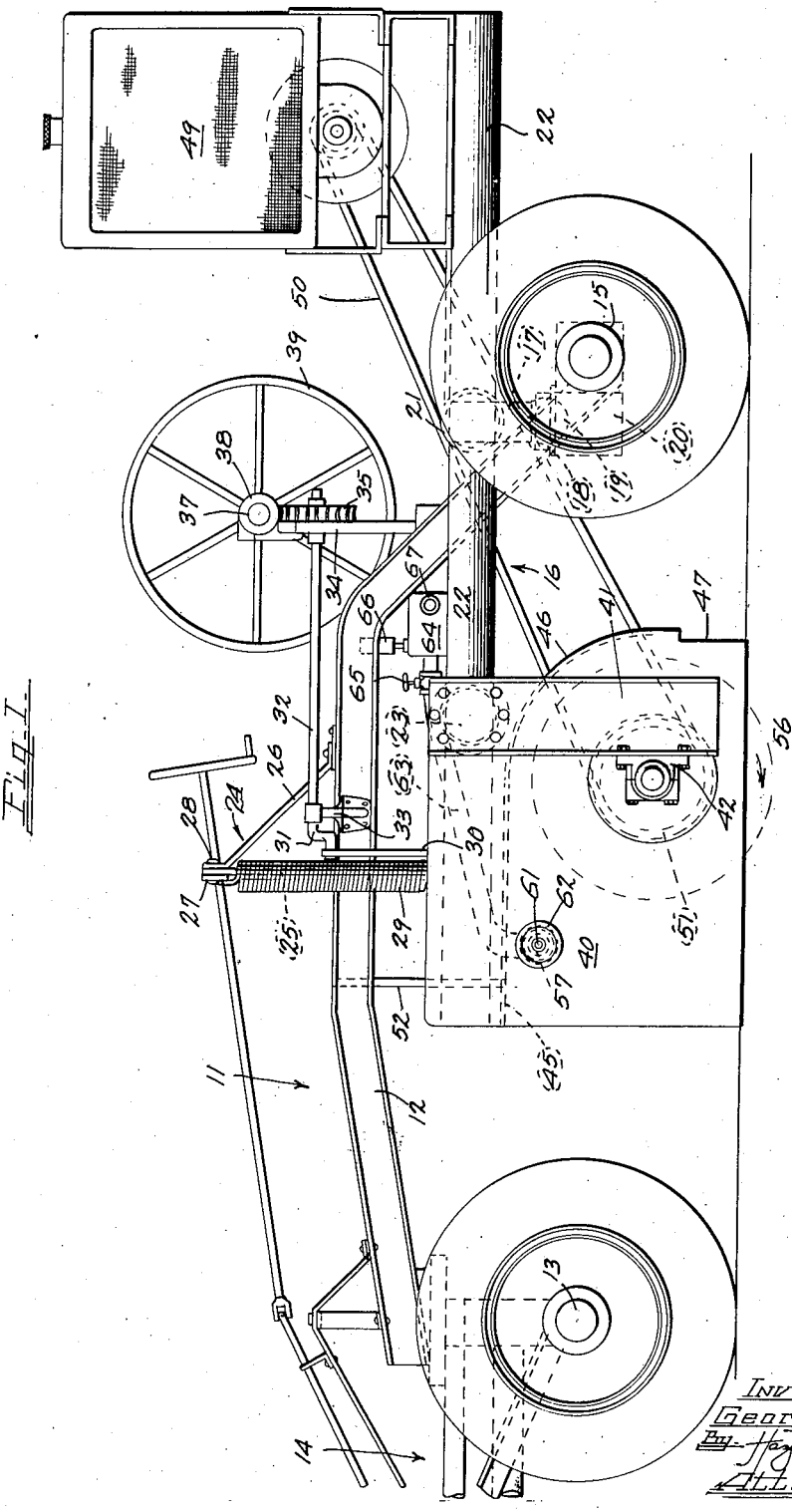
Fig. 1 is a side elevation of one form of my invention.
Figure 2:
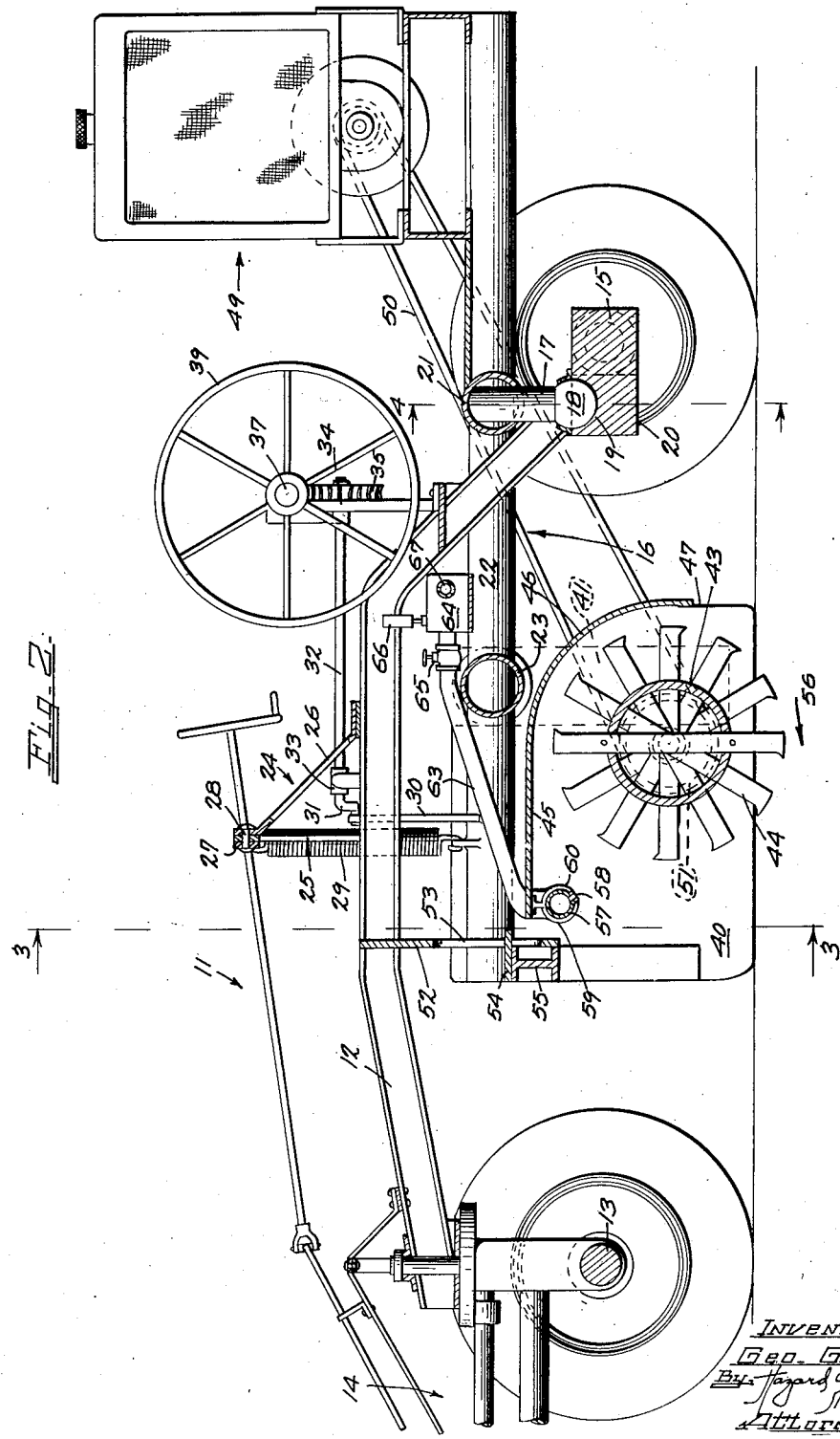
Fig. 2 is a similar elevation of the structure shown in Fig. 1 with parts broken away along a vertical longitudinal plane.
Figure 3:
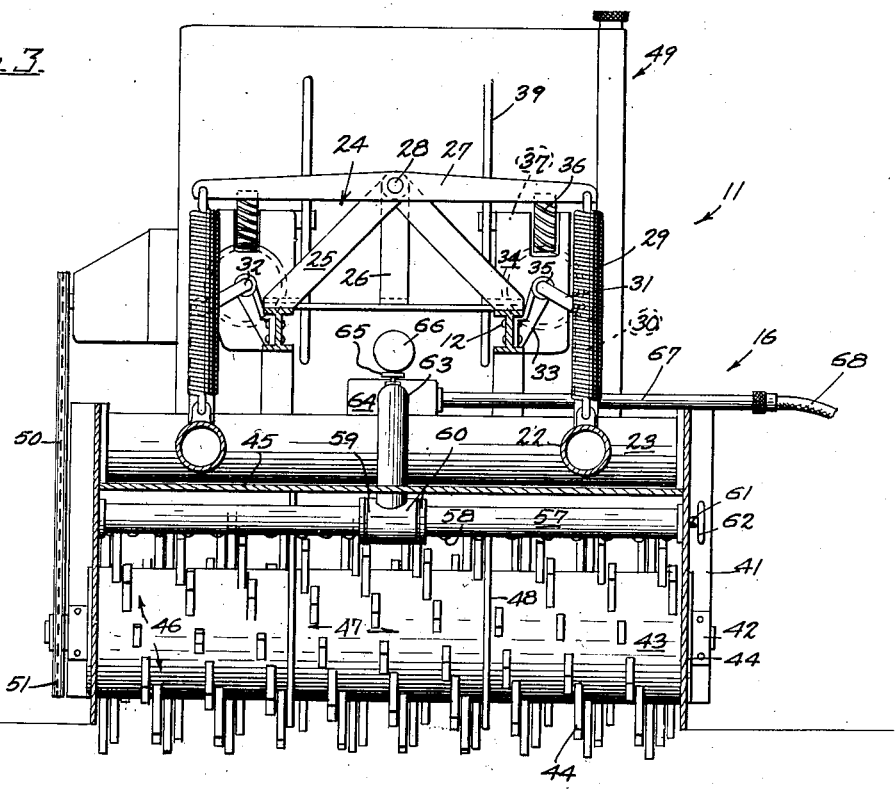
Fig. 3 is a transverse section on the line 3—3 of Fig. 2 in the direction of the arrows.
Figure 4:
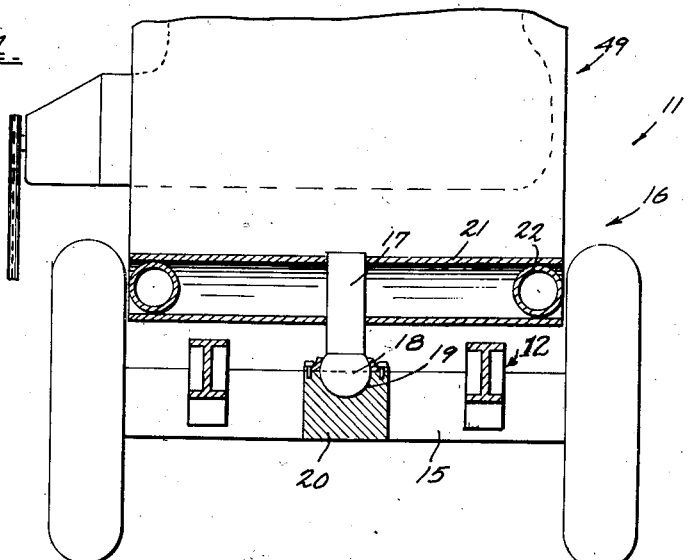
Fig. 4 is a transverse section on the line 4—4 of Fig. 2 in the direction of the arrows with the post, ball and wheels shown in elevation.

Dealing first with the construction of Figs. 1, 2, and 3. In this I utilize a vehicle 11 constructed somewhat of the type of a grader and, in fact, the frame 12 may be substantially that used by certain types of graders. The front axle 13 with the wheels is swiveled to the front of this frame and the vehicle is towed by a tow bar 14. The frame connects to a rear axle housing 15 having rear wheels thereon and this forms a substantial and rigid vehicle frame.

A feature of my invention comprises the manner of mounting the mixer and this employs what may be termed a supporting or floating frame 16. This frame utilizes a single post 17 having a ball 18 at the bottom seated in a spherical socket 19, this socket being in a substantial block 20 integral with the rear axle housing 15. A center transverse tube 21 is secured to the post 17 and extends from side to side of the vehicle and through this tube there extend a pair of longitudinal side tubes 22. On the forward part of the longitudinal tubes there is a forward transverse tube 23. I find it of advantage to use tubes or pipes for this floating frame as it allows a light and yet strong construction to be built.

In order to adjust this floating frame, I employ a rigid brace designated by the assembly numeral 24 which is illustrated as having side legs 25 and a sloping leg 26, thus forming a rigid construction. Pivotally mounted on the top of the bracket there is a balance lever 27 having the pivot 28, and connecting the ends of the lever and the forward ends of the side tubes 22 there are substantial tension springs 29.

The adjustment of the floating frame 16 is by means of links 30 which are connected to the forward ends of the side rails 22, preferably rearwardly of the springs. The top of each link is connected to a crank 31 forming part of a shaft 32, such shaft being journaled at its forward end in a journal bracket 33 and in a rear journal support 34 also connected to the fixed frame 12. Each of the shafts 32 have a worm wheel 35 which is operated by a worm 36 on the hand wheel shaft 37, this shaft having journals 38 at the upper end of the journal support 34. There are two operating hand wheels 39. Part of the weight of the forward end of the floating frame 16 is carried by the springs and part of this may be also taken by the links 30, the cranks 31, operated by the shafts 32, through the medium of the worm wheel 35 and worm 36 operated by these hand wheels. Therefore, by turning both hand wheels simultaneously in the same direction, the forward end may be raised or lowered, or if they are operated in opposite directions, the frame will be tilted to one side or the other, and this whole fore and aft rocking movement and lateral tilting is carried through the medium of the post 17 and its ball and socket mounting on the rear axle housing the springs 29 cooperate with the links 30, the springs supporting part of the weight of the forward portion of the movable frame. Therefore it is easier to acuate the links to move this forward end.

Secured to the opposite ends of the forward transverse tube 23 there are heavy side plates 40 and outside of these there are vertical channels 41 to which the plates are secured, and at the lower end of these plates there are secured the spool journals 42 for the axle of the cylindrical spool 43. This spool has diametrical openings with the mixing teeth 44 extending therethrough. A cover plate 45 extends horizontally between the two side plates 40 above the teeth and has a curved section 46 preferably concentric with the spool at the rear portion, there being an open section 47 for the free deposit of the material being mixed. It is to be noted by this construction that the side plates 40 extend both in front and to the rear of the teeth mounted on the spool and that the mixing elements are substantially enclosed at the two sides and the top. This housing formed by the side plates 40 and top plate 45 forms, in effect, a large mixing chamber.

I prefer to mount the mixing teeth in the spool in two series of helical rows. There may be considered a first series 46' with a steep slope extending completely around the periphery of the spool and another series 47' having a gradual slope, the spools rarely being of sufficient length for this latter helix to extend around the spool. This construction offsets the teeth of the series 46' extending peripherally of the spool so that each tooth is brought to act on material which has been unworked by the tooth immediately ahead. The arrangement on the long helix 47' brings the teeth at different portions of the spool into action one after the other and thus gives a more uniform resistance to the rotation of the spool than if the teeth were in rows extending in a straight line parallel to the axis from one end to the other of the spool, in which case a large number of teeth would be brought into action at one time.

On account of the teeth being arranged in the helix 46', the tendency is to shift the road material being mixed and worked from one end of the spool toward the other and this would form a relatively large windrow at one end of the spool. To prevent this, I employ longitudinally positioned scour plates 48, which are secured to the top plate 45 and to the curved section 46 thereof, these plates having a sufficiently large opening to accommodate the spool. In this construction I have illustrated the spools being hollow in order to secure a light construction.

The manner of driving the spool is by means of an engine designated generally 49. This operates a sprocket chain 50 which gears with a sprocket wheel 51 secured to the axle of the spool, this giving a power drive to the spool. The engine, to a certain extent, counterbalances the weight of the spool and the housing enclosing this, and as the spool and the engine are both mounted on the floating frame the rocking of this up or down at the front, or tilting sideways, does not affect the power drive.

In order to prevent the floating frame 16 and the spool from swiveling sideways, I employ a substantial guide plate 52 which is attached to the frame members 12 and depends therefrom. This has a vertical slot 53 therein, into which slot extends a finger 54 secured to a transverse beam 55, this beam being secured to the forward end of the side tubes 22, and forms a rigid front connection for the tubes. The finger is free to slide up and down in the slot 53 due to the raising and lowering of the front end of the floating frame. It also allows tilting, but it holds the spool always transverse to the vehicle frame 12.

As the machine is towed over the ground in a forward direction, the engine drives the spool with its mixing teeth so that these teeth at the bottom travel in a forward direction, as indicated by the arrow 56. This direction of movement propels or kicks the material to be worked upwardly and forward of the spool, causing this to build up a substantial loose mass in front of the spool; which mass of material, that is: the aggregates forming the road material, undergoes a continuous rolling motion in a counterdirection of rotation to that of the spool. The mass builds up to such a height that it flows over the top of the spool. The material thus passing over the top of the spool is driven rearwardly and downwardly with a considerable propulsive force by the blades at the top of the spool having a rearward motion.

Another important feature of my present invention is an equipment for spraying the road oil, asphalt, or other liquid, into the mass of aggregates. For this purpose I employ an oil spray pipe 57 having jets 58. This pipe is swiveled in a central support 59 having stuffing boxes 60 to make a leak-proof connection. A stem 61 connected to the spray tube extends through one of the side plates 40 and has a handle 62 thereon which allows tilting the spray pipe and the jets 58 to discharge into the mass of mixing aggregates at the desired point. The spray pipe is fed by a feeder pipe 63 which leads to a meter 64, there being a control valve 65. A pressure gauge 66 is also employed and the oil or other liquid is brought to the spraying system by means of a transverse feed pipe 67, to which is connected a flexible hose 68, this latter leading to a tank truck which may move alongside the road beside the mixer. It may either travel under its own power at the proper rate of speed or be towed by the tractor used to tow the mixer.

By this type of construction, it will be seen that I have obtained an effective balance of the floating frame carrying the engine and the spool with the mixing blades and the housing for this spool and blades; that proper provision has been made for the raising and lowering of the mixing spool and blades and tilting these to accommodate the camber of the road, or for similar purposes; and, in addition to this, the oil may be directly sprayed on to the material undergoing mixing, and thus the oil is incorporated into the mass of aggregates while they are undergoing a mixing action. The spraying system may supply the entire amount of oil or asphaltum necessary in the mixing, or a portion thereof. At present it is the custom to spread the road aggregates and then flow oil to these in proportions of definite quantities per square yard or square foot of road surface.

Figure 5:
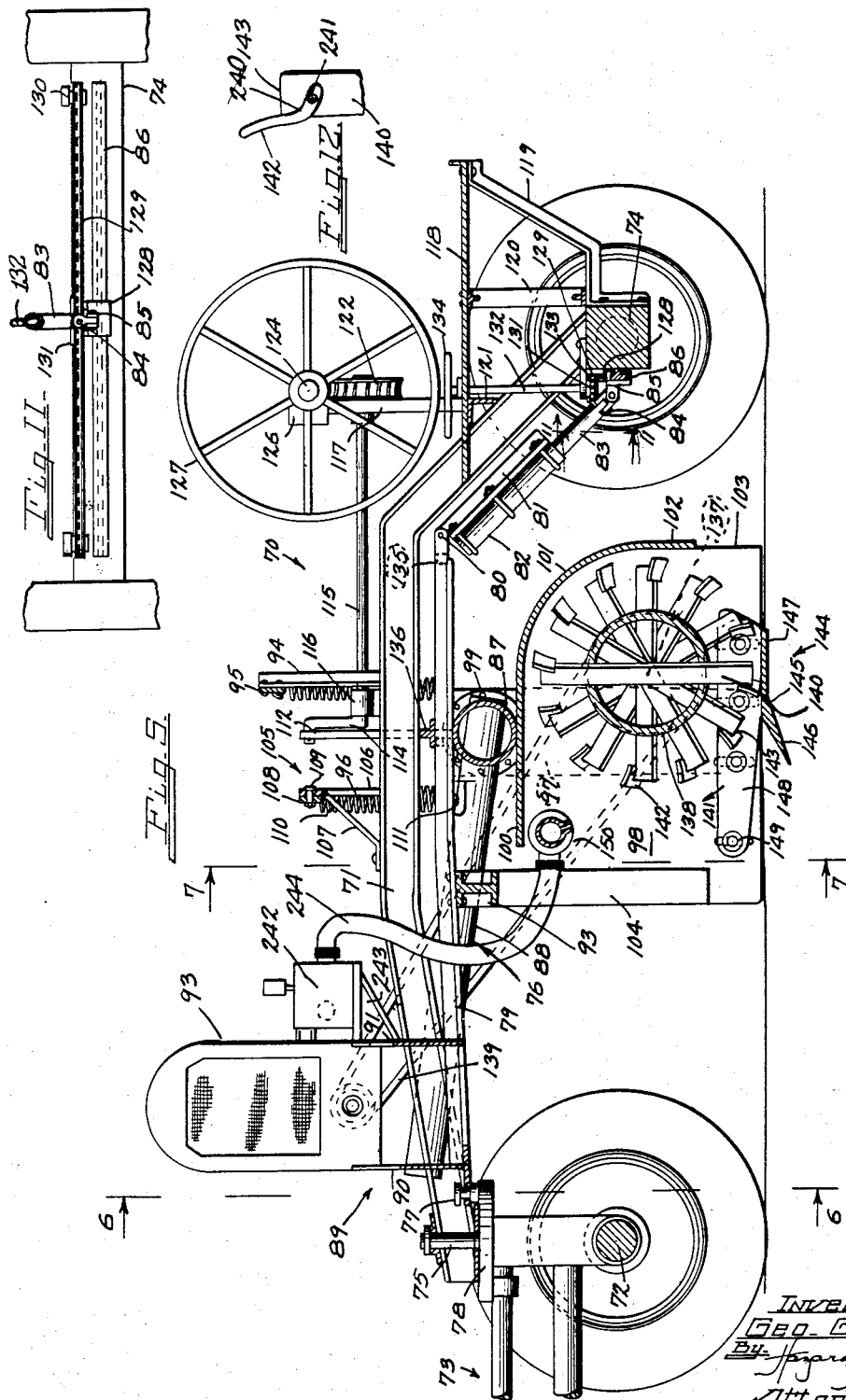
Fig. 5 is a side elevation partly in section of a modified construction showing, in addition, the cutting and elevating blade.
Figure 6:
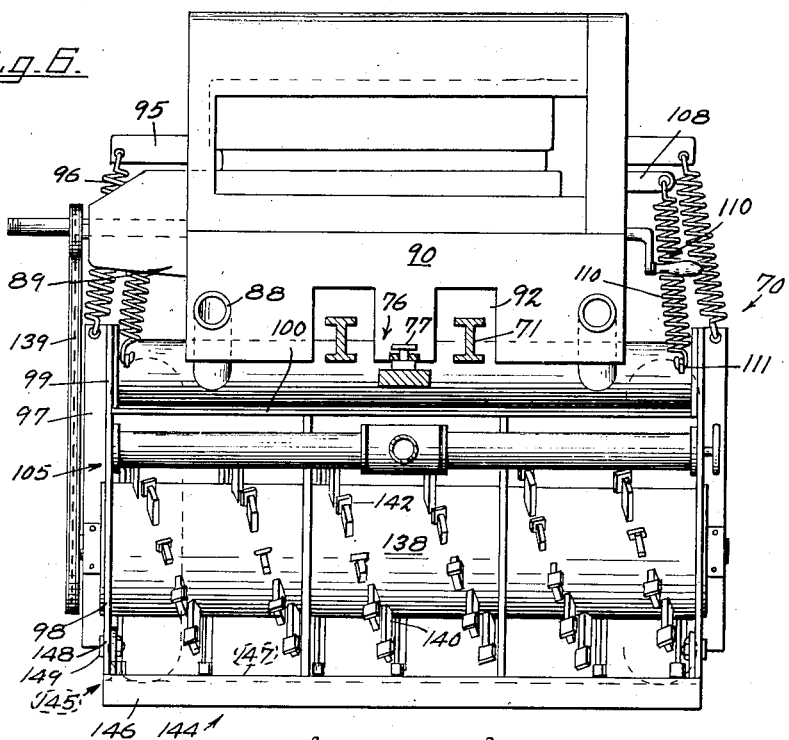
Fig. 6 is a transverse section on the line 6—6 of Fig. 5 in the direction of the arrows with the front wheels omitted.
Figure 7:
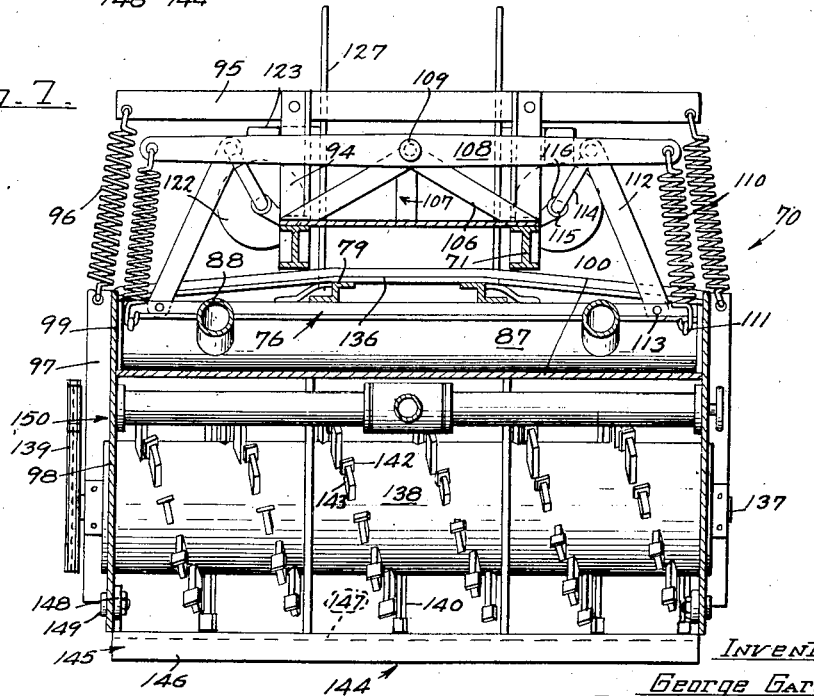
Fig. 7 is a transverse section on the line 7—7 of Fig. 5 in the direction of the arrows.

Dealing with the construction of Figs. 5, 6, and 7, in this arrangement I employ a vehicle 70 in which I find I may make use of a rigid frame 71 similar to that used on certain types of graders. This has a front axle 72 with the front wheels and tow bars 73, and a rear axle housing 74 with rear wheels. The front axle has a pivotal mounting to the fixed frame by a king bolt 75. A movable frame 76 is pivoted at its forward end to a pivot pin 77, this being attached to a plate or the like 78, which is connected rigidly to the forward end of the rigid frame. This frame 76 is illustrated as formed of two Z-bars 79 which diverge from the pivot 77 and are connected at their rear end by a pivot 80 to T-bars 81. These latter are clamped to an outside pipe 82 which telescopes over an inside pipe 83, this forming a telescopic guide. The inside pipe has a universal joint connection 84 to a carrier 85, which operates on a transverse track 86. This is an arrangement somewhat like that used on certain types of graders; the particular details for giving a lateral movement to the guide formed of the pipes 82 and 83 is detailed hereinunder.

A suspension frame having a cross tubular member 87 is secured in a rigid manner to the Z-bars 79 forming the frame 76, and extending forwardly from this transverse tube there are a pair of longitudinal tubes 88, these tubes being used for the sake of lightness and strength of construction. The engine support 89 utilizes a fixed front plate 90 which is welded or similarly secured to the front end of the frame 76 connecting across the Z-bars back of the pivot 77, and a rear plate 91 is also secured by the same bars. These plates have openings 92 to accommodate the members forming the frame 71. The engine 93 is mounted on the base formed by these plates 90 and 91. These plates have apertures through which extend the tubes 88, which tubes are welded to the plates 90 and 91 at such apertures, thus forming a rigid suspension structure. In addition, a transverse I beam 93 is secured to the under side of the Z-bars 79 of the frame 76 and this beam is rigidly secured to the longitudinal tubes 88.

The suspending means for the suspension frame comprises uprights 94 which extend upwardly from the longitudinal beams forming the frame 71 and on top of these uprights there is a transverse plate 95. From the ends of this plate there are tension springs 96 which, at their lower ends, are secured to outside channels 97. These channels have substantial side plates 98 secured thereto, which plates are also secured to the ends of the transverse tube 87, as indicated at 99. These plates 98 form the sides of the housing for the mixing spool and mixing teeth, which housing has a top cross plate 100, this having a curved section 101 concentric with the axis of the spool and a downwardly extending section 102 with an opening 103 at the bottom. A stiffening plate 104 is attached to the I beam 93 and to the forward ends of the side plates 98. It will, therefore, be seen that there is a resilient suspending support for the spool housing and for the frame 76 which carries this housing from the upper or rigid frame 71. An additional resilient support is provided by the brace 105 which has side or lateral legs 106 and forwardly extending bracing legs 107, these being secured to the bars forming the frame 71. A balance lever 108 is mounted on a pivot 109 of the brace 105 and at its ends carries auxiliary extension spring 110, these being connected at the bottom to eyes 111 secured to the outer portion of the transverse tube 87. Lateral links 112 are also pivotally secured at 113 to the transverse tube 87 adjacent its outer ends and have a pivotal connection each to a crank 114, the cranks being part of the rocking shafts 115 which extend longitudinally of the machine and are mounted in forward journals 116 secured to the frame bars 71 and to a journal plate 117. This latter plate extends upwardly from a platform 118 which is mounted on supporting posts 119 and 120 extending upwardly from the rear axle housing and from an angle 121 secured to the rear portion of the fixed frame 71. Each of the shafts 115 has a worm wheel 122 which is operated by a worm 123 on the wheel shaft 124, which shaft is journaled in journals 126 on the upper parts of the journal plates 117. Each of these shafts has a large operating hand wheel 127. Therefore, by the simultaneous operation of the wheels 127 in the same direction, the lower or suspending frame 76 may be moved up and down at its rear end, moving on the loose pivot 77, or when these wheels are operated in opposite directions one side of this suspending frame will be lowered and the other side elevated.

The mechanism for giving a lateral movement to the frame 76 and the spool housing with the spool therein, utilizes the transverse track 86 and the carrier 85. The track 86 is mounted on the rear axle housing, and the carrier 85 is connected to the ends 128 of a chain 129. This chain operates over pulleys 130 secured at each end of the axle housing and over a sprocket 131 on the operating shaft 132, this shaft being journaled in a plate 133 at the bottom and in the platform 118. The upper end of the shaft has an operating wheel 134. The Z-bars of the frame 76 are spaced apart at the rear end by a spacer 135 and at the center portion by a transverse bar 136. The pivot rod 80 secured to the ends of the Z-bars 79 has the T-bar 81 secured thereto at its center. Hence, when the carrier 85 is shifted to one side or other on the track 86, it swings the rear end of the frame 76 on the pivot pin 77 at the front of the machine. This permits changing the axial line of the spool from one squarely transverse across the vehicle from side to side to a position inclined thereto at a slight angle. The movement is limited to a certain extent by the springs 96 and 110 and also by the action of the links 112 and the cranks 114, but the action is sufficient to cause the mixer to swing slightly to one side of the machine in order to operate on material outside beyond the end of the spool when the spool is squarely transverse to the machine in a central location.

The particular type of spool and teeth in this construction utilizes an axle 137 journaled in the channels 97, to which axle the spool 138 is connected. The axle and spool are driven by a sprocket chain drive 139 from the engine. The teeth 140 are illustrated as being continuous and extending through openings on opposite sides of the spool which is hollow, and these teeth are placed with their opposite flat sides at a slight inclination to the axis of the spool. This causes one end of each tooth, in passing forwardly in the direction of the arrow 141, to kick the material laterally in one direction and the opposite end of the same tooth, when it engages the material, kicks it laterally in the opposite direction; thus each tooth in its rapid action operates to not only drive the material forwardly but also to slightly kick this material to the left and to the right hand sides. In the type of mixer illustrated in Figs. 5 through 7, I prefer to employ wear plates 142, which plates are secured to the lower front edge of the teeth and extend outwardly beyond the outer end 143 of the teeth. The wear plates are wider than the teeth and as the teeth are arranged in a helical manner considered peripherally of the spool and in helical lines considered longitudinally of the spool, there is a continuous overlapping mixing action of the teeth.

Another important characteristic of my present invention as illustrated in Figs. 5 through 7 is the employment of an elevator 144. This has a transverse blade 145 with a downwardly extending cutting point 146 and a flat section 147. This blade is rigidly secured to side plates 148, which plates are on opposite sides and have a slotted and bolted connection 149 with the side plates 98 of the spool housing. The slots are vertical or substantially so, so that the blade 145 may be raised and lowered in reference to the ends of the teeth.

In operation, this elevator is adjusted by means of using the hand wheels 127 so that it will substantantially cut through the road surfacing material to the road bed or cut into as great a proportion of this as is desired. The blade elevates the road surfacing aggregates and these are subjected to the mixing action of the teeth while passing over the downwardly inclined cutting part 146 of the blade and the flat portion 147. The use of this cutting and elevating blade, which I designate an elevator, is an important characteristic of my invention as it lessens the wear on the mixing teeth. Where this elevator is not used, the teeth have to force their way downwardly through the road surfacing material, meeting the resistance of the more or less solid mass of material, which causes a rapid wearing of the teeth, but where the road surfacing material is first cut by the elevator blade, it is loosened and the teeth are only required to have the mixing function, and are not required to loosen the road surfacing material from the road bed.

In some types of road material mixing the o'l is already spread on the aggregates before the mixing machine is used. In some cases it is advisable to add additional oil, or this may be added to the dry aggregates, in which case I utilize the oil spray pipe 150 which may be mounted inside of the spool housing and swivel in the same manner as described in connection with Figs. 1 through 4. The oil may also be supplied through a meter in the same manner and taken from a supply tank running beside the mixer.

In my further modified construction of Figs. 8, 9, and 10, I elevate the material and carry it elevated for a longer distance than in the prior construction and subject the road surfacing material to double mixing. In this construction I employ a vehicle 160 having a lower frame 161. This lower frame employs longitudinal channel beams 162 on each side, the rear end of which is connected rigidly to an axle bearing 163. Vertical studs or angles 164 extend upwardly from the rear ends of the channel beams 162. At the forward end there are also studs 165 which connect to an upper frame 166 also having longitudinal channel beams 167. At the forward end there are transverse bars 168 formed of channels and at the upper end of the studs 164 there are transverse channel bars 169, thus forming a rigid structure for the vehicle frame. The axle bearing is rigidly secured to the axle 170, this being a non-rotating axle, with wheels 171 rotating thereon. It will thus be seen that this provides a two-wheeled vehicle. At the forward end there is a draw bar 172 which may be directly connected to the draw bar of a tractor or may be connected to a dolly having wheels, which dolly may be towed by a tractor.

The axle has a floating frame 173 mounted thereon. This frame has side channel beams 174. Secured to the webs of these channels there is a plate 175 which has, at one portion, an indented section 176 from which there extend upwardly side plates 177 of the mixer housing 178. Secured to the inside of the plates 175 and thus securely attached to the channel beams 174, there is a track 178'. This is formed of channel beams 179 with the flanges extending inwardly to the upper flange 180 forming a track on which slides the sprocket chain 181 of the upper run 182 of an endless slat conveyor 183. This conveyor operates over a drum 184 at the discharge end of the conveyor and over another drum 185 at the loading end of the conveyor. The flange 180 is bent downwardly as indicated at 186 at opposite ends.

The drive for the conveyor is by means of a sprocket gear 187 secured to the hub of one of the wheels, and from this gear a sprocket chain 188 extends to a driving sprocket gear 189 secured to the drum 184. This drum and the sprocket gear 189 are mounted on a shaft 190 which is journaled in the opposite side beams 174. The drum 185 also has a sprocket gear 191 connected thereto, the drum and the sprocket being on a shaft 192 also journaled or mounted in the outside beams 174. The sprocket chain 181 on each side of the endless chain conveyor operates over the sprockets 189 and 191 and as it is driven by the sprocket at the discharge end, the upper run of the slat conveyor is maintained in a taut condition.

The digging or cutting blade 193 is formed with an upper plate 194, a lower plate 195 meeting at the line 196, the upper plate having a projecting sharpened end 197. A concentric plate 198 is secured to the rear end of these plates, and both plates and this end are rigidly attached to the forward end of the side beams 174.

The means for raising and lowering the elevator comprise opposite side links 199 which have a pivotal connection 200 to the outer beams 174. These links are attached to cranks 201 at their upper ends, which cranks are secured to a transverse crank shaft 202, which shaft is journaled in journals 203 secured to the upper beams 167 and the upper frame 166. This shaft has a sprocket gear 204 driven by a sprocket chain 205. This leads to a driving sprocket 206 mounted on a worm wheel shaft 207. Such shaft is journaled in a gear housing 208 secured to the rear end of the upper frame 166. The worm shaft is driven by a worm gear 209 actuated by a worm 210, this latter being on a wheel shaft 211 operated by the hand wheels 212. By this construction, turning the wheel in one direction the cutting blade may be lowered and in another direction it may be raised, and as the blade is rigidly connected to the conveyor frame the conveyor manifestly is tilted to different angles in reference to the ground surface.

The housing 178 for the mixers employ the side plates 177 above described, which are rigidly secured to the side beams 174. There is a forward top cover plate 213 connecting the two side plates 177. This has a curved concentric rear portion 214, leaving an open space 217 above the upper run of the conveyor. At the rear end there is a second top plate 218, a rear concentric portion 219, leaving a second open space 220 above the upper run of the conveyor.

The mixers comprise spools 221 having axles 222 supported in the journals on the side plates 177. Through these spools extend the mixing teeth 223. The axles of the spools have sprocket wheels 224 which are driven by sprocket chains 225 from the engine shaft 226 of the engine 227. This engine is supported on an engine base 228 formed of a heavy plate extending transversely between the side plates 177. There is also a rear upright projecting plate 229. This acts to inclose the mixing chamber and protect the engine from the dirt of the mixing. A working platform 230 is secured to the forward end of the vehicle frame and provides a platform for the operator handling the controlling wheel 212.

In order to spray the aggregate being mixed, with oil or other binder material, I provide oil spray pipes 231 and, if desired, in addition, a rear spray pipe 232. These may connect to a meter and have a flexible hose attached for feeding the oil from a tank truck to operate beside the mixer.

By the construction of Figs. 8, 9, and 10, it will be seen that the whole vehicle is practically supported on the wheels on opposite sides and it is substantially balanced on the axle of these wheels. The gear ratio between the wheels and the drive of the endless slat conveyor, is such that the upper run of this conveyor moves rearwardly in the direction of the arrow 233 at such a rate that a point on this upper run remains constantly over a certain point on the ground. The purpose of this is that as the material is dug up by the cutting blade and deposited on the conveyor, it is carried rearwardly by the conveyor at a speed proportional to the forward movement of the vehicle so that the material, when discharged at the discharge end of the conveyor, will be of the same depth as that cut from the aggregates spread on the road surface. The cutting blades rotate in the direction of the arrow 234 and thus function to throw the material forwardly into a loose agitated mass and carry material over the top of the spools when this loose mass reaches a sufficient height on the conveyor. The loose mass develops a general rotational movement in a direction counter to that of the spool. The blades are designed to have merely a working clearance above the top of the conveyor so that substantially no material will pass under the mixing teeth without being operated upon before the mixing action.

It is to be noted that at the forward or intake end of the mixing chamber the sides 177 are splayed outwardly as indicated at 235, and the blade is of sufficient width to give the full width of the distance between the beams 174. As above mentioned, the conveyor with the cutting blade may be changed as to inclination to alter the depth of cut, and the blade may cut through the aggregate to the road surface, thereby elevating all of the road aggregate, or it may cut to the desired depth to take any portion of this. It will be seen by this construction with the one motion the road material is subjected to a double mixing, and as the material is loosened from the road surface, the grinding and wearing action on the teeth of the mixer is materially reduced.

In addition, as the material falls over the rear end of the conveyor it compacts more or less in striking the road surface.

In Fig. 12 I illustrate detachable wear plates 142. These have ears 240 which, by means of bolts 241, are secured to the mixing teeth, the bolts extending transversely through the teeth adjacent their ends.

I also make provision for pumping the oil from a tank truck and spraying it through the oil spray pipes. The construction illustrated in Fig. 5 shows an oil pump 242 mounted on a bracket 243 and being driven from the engine. The oil pump being regulatable as to its discharge may also function as an oil metering device and thus meter the quantity of oil used for the same purpose as the meter 64 of Fig. 2. Suitable feed pipe connections lead from the pump laterally of the mixer and may draw the oil directly from the discharge pipe of an oil tank or an oil carrying trailer moved beside the mixer while the mixing is under operation. I provide a suitable means for varying the speed of the pump and for stopping the flow of oil when the mixer is standing still. A flexible pipe 244 is illustrated as connected from the pipe to the spray pipe in Fig. 5. It is to be understood that a similar construction may be utilized in the other arrangements of my mixer. This feature of operating the pump from the power supply on the mixer eliminates the necessity of having men on the tank trucks to handle the pumps for discharging the oil.

It will be noted that a characteristic feature of my invention is that the teeth on the spool are comparatively narrow and have practically no function in lifting the road surfacing aggregate materials upwardly, but have the function on account of their high speed of rotation, of driving particles of this aggregate forwardly in front of the spool forming a loose mass of agitated material. On account of the spool being of considerable diameter compared with the diameter of the circular swing of the teeth, this loose mass is built up to such a height that it overflows rearwardly over the top of the spool and in this overflowing movement the rearward rotating teeth project the aggregate material rearwardly with considerable force.

In the specification and claims where I use the term "road surfacing material" or the equivalent, this means the material which is operated by the mixing teeth of the spool and which is thus mixed with the oil and worked into a material for surfacing a road. This road surfacing material is acted upon by the teeth of the spools while it is in place on the road subgrade as illustrated by the machine of Fig. 2 or when it is cut by the cutting blade of Fig. 5 and elevated into contact with the teeth of the spool as in the construction of Fig. 5, or when it is cut by the cutting blade and forced onto the endless belt conveyor of the construction of Fig. 8. In all of these various forms of my invention the spool and teeth operate on the road surfacing material. Therefore the material acted upon by the mixing teeth and in which the oil is injected is road surfacing material whether or no during the mixing action it is on the road sub-grade or cut therefrom and elevated above the sub-grade.

Various changes may be made in the details of construction without departing from the spirit or scope of the invention as defined by the appended claims.

I claim:

1. In a road oil mixer, a vehicle frame, a floating frame pivotally mounted on the vehicle frame, a mixer connected to the forward end of the floating frame, and an engine mounted on the rear end of such floating frame, means to drive the mixer from the engine, and means mounted on the vehicle frame to control the position of the forward end of the floating frame and hence the mixer to raise, lower and laterally tilt the mixer.

2. In a road oil mixer, a vehicle having a vehicle frame, a floating frame pivotally mounted on the vehicle frame on a single pivot, a mixer suspended below the forward end of the floating frame, an engine mounted on the rear end of such frame, a drive from the engine to the mixer, means mounted on the vehicle frame to control the position of the forward end of the floating frame and hence of the mixer, and means to restrict the lateral movement of the floating frame and mixer.

3. In a road oil mixer, a vehicle having a vehicle frame rigidly connected to a rear axle housing, a floating frame having a single pivotal mounting on said housing, a mixer comprising a rotatable spool having teeth suspended below the forward end of the floating frame, an engine mounted on the rear end of the floating frame back of the pivot, a drive connection from the engine to the spool to rotate the lower teeth in a forward direction, a control means on the vehicle frame and connected to the floating frame to raise and lower and laterally tilt the forward end of such frame, and means to restrict the side movement of the forward end of the floating frame and hence of the mixer.

4. In a road oil mixer, a vehicle having a vehicle frame with a mixer housing mounted therein, a cutting and elevating blade, an endless moving conveyor, a drive for the conveyor to move the upper run rearwardly while the vehicle is towed in a forward direction, the conveyor receiving the road surface material cut and elevated by the blade, a mixer mounted in the housing above the conveyor, and a power means to operate said mixer.

5. In a road oil mixer, a vehicle having a vehicle frame, a conveyor frame having an endless belt conveyor adjustably mounted in the vehicle frame, with a drive connection from the wheels of the vehicle to move the upper run of the conveyor rearwardly while the vehicle is towed in a forward direction, a cutting and elevating blade connected to the conveyor frame to cut transversely into road surface material to elevate said material to the conveyor, a mixer having a rotatable spool with outwardly extending teeth, and a power means to drive said spool and teeth to mix the material passing underneath the teeth on the upper run of the conveyor.

6. In a road oil mixer, a vehicle having a vehicle frame, a conveyor frame pivotally mounted therein and having an endless belt type conveyor with the upper run extending along the upper side of the conveyor frame, an elevating and cutting blade secured to the forward end of the conveyor frame adapted to cause the deposit of material on the upper run of the conveyor while the vehicle is moved in a forward direction, means to drive the conveyor with the upper run moving rearwardly as the vehicle is moved forwardly, a plurality of mixers each having a spool and mixing teeth extending therefrom, one mixer being positioned forwardly and the other rearwardly of the pivotal line of the conveyor frame and effecting partial balance of such frame, the mixing teeth being positioned to mix material on the conveyor, an engine, means to drive the mixing spools by said engine, and means to control the depth of cut of the cutting and elevating blade.

7. In a road oil mixer, a vehicle having a vehicle frame with a front and rear axle, the front axle being connected to the frame by a king pin, the rear axle having a housing rigidly connected to the rear end of the frame, a floating frame pivotally connected to the forward part of the vehicle frame and having its rear end connected to the rear end of the vehicle frame by a connection permitting up and down lateral tilting movement and side movement, a rotary mixer having a spool and mixing teeth connected thereto suspended from said suspended or floating frame, and means mounted on the vehicle frame to regulate the position of the suspended or floating frame and hence the mixer relative to the material to be mixed.

8. The method of mixing road surfacing materials in which the solid aggregates to form the road are in a layer on the road subgrade, comprising cutting the aggregates of the layer from the subgrade, depositing such aggregates on a continuously moving conveyor, mixing such aggregates while on the conveyor, and depositing the aggregates from the end of the conveyor onto the road subgrade.

9. The method of mixing road surfacing materials as claimed in claim 8, and mixing the aggregates on the conveyor comprising driving the particles of the aggregates in a forward direction relative to the conveyor and maintaining a loose agitated mass, then redepositing the aggregates from such mass against the conveyor.

10. The method of mixing road surfacing materials as claimed in claim 8, mixing the particles of the aggregates on the conveyor by means of a cylindrical spool having radial mixing teeth extending longitudinally of the spool operating adjacent the conveyor in an opposite direction thereto to project particles of the material on the conveyor in a forward direction and building up a mass of loose agitated material in front of the spool, injecting a liquid binder into such mass and overflowing the mixed aggregates with the binder over the top of the spool and depositing the same on the rearwardly moving conveyor.

11. In a road oil mixer, a vehicle frame mounted on the front and rear axle, a floating frame pivotally mounted adjacent the front axle, a track adjacent the rear axle, a carrier mounted on said track for transverse movement on the track, a connection between the carrier and the rear end of the floating frame, an engine on the floating frame adjacent the forward end, a mixing spool suspended from the floating frame having mixing teeth, a drive from the engine to the spool, the lateral shift of the carrier on the track shifting the floating frame on its pivot and inclining the spool sidewise in reference to the direction of forward movement of the vehicle.

12. In a road oil mixer as claimed in claim 11, an upwardly sliding connection between the rear end of the floating frame and the carrier, and means to raise, lower and laterally tilt the floating frame in reference to the vehicle frame.

13. In a road oil mixer, a vehicle frame having a front and a rear axle, a floating frame pivotally mounted adjacent the rear axle, an engine located on the floating frame rearwardly of the pivot, a mixing spool having mixing teeth suspended from the floating frame forwardly of the pivot, a drive connection from the engine to the spool, and means mounted on the vehicle frame to raise, lower and laterally tilt the forward portion of the floating frame and hence the spool.

14. In a road oil mixer as claimed in claim 13, the vehicle frame having a depending guide plate, and means on the floating frame to engage therewith to prevent sidewise shifting of the forward end of the floating frame.

15. A road oil mixer having a vehicle frame with a front and rear axle, a floating frame pivotally mounted adjacent the rear portion of the vehicle frame, an engine mounted rearwardly of the pivot on the floating frame, a housing having side walls, a top and a partial rear wall suspended from the forward portion of the floating frame, said housing having a mixing spool with mixing teeth therein, a drive from the engine to the spool, and means on the vehicle frame to raise, lower and laterally tilt the forward portion of the floating frame.

16. In a road oil mixer, an endless conveyor belt, means to deposit material for a road surface on the forward upper run of such belt, means to move the conveyor belt forwardly over a road surface and simultaneously move the upper run of the belt rearwardly, a mixer mounted on the belt having a rotatable spool with radially extending mixing teeth, and means to rotate the spool with the mixing teeth engaging the material on the conveyor belt and projecting such material in a forward direction.

17. In a road oil mixer, a vehicle frame having a pair of supporting wheels, an endless conveyor mounted thereon and having its upper run extending in a rearward direction while the vehicle is moved forward, a cutting and elevating blade at the forward end of the conveyor to cut and elevate road material to the conveyor, a housing mounted above the conveyor having opposite sides, a top and a partial back wall, a rotatable spool mounted in the housing having radial mixing teeth, and means to rotate the said spool to mix material moved rearwardly on the upper run of the conveyor.

18. In a road oil mixer, a vehicle frame having front and rear wheels, a floating frame pivotally mounted at one part on the vehicle frame, a housing having sides, a top, and a partial back closure suspended from the floating frame and extending transversely thereacross between the front and rear wheels, a rotatable spool mounted in said housing, the spool having individual radially extending mixing teeth, an engine mounted on the floating frame, a drive from the engine to the spool to move the teeth engaging the road surfacing material in a forward direction and project material forwardly, a link mechanism interconnecting the vehicle and floating frame, and means on the vehicle frame to operate said link mechanism for raising, lowering, or laterally tilting the floating frame and the spool while the mixer progresses over the ground.

19. In a road oil mixer as claimed in claim 18, a spray pipe positioned in the housing and extending from side to side forward of and above the spool, an oil metering means mounted on the floating frame, and a connection from said metering means to the spray pipe.

20. A road oil mixer having a vehicle frame, a floating frame mounted thereon, a housing secured to part of the floating frame and having a top, sides, a back with an opening adjacent the ground and an opening in the front, a rotatable spool journalled in the sides of the housing, a plurality of individual mixing teeth on the spool positioned longitudinally and circumferentially thereof, an engine mounted on another part of the floating frame, a drive from the engine to the spool and means to raise, lower and laterally tilt the part of the floating frame with the housing and spool, an oil spray pipe extending transversely across the housing above and in front of the spool, said spool being rotated to have the lower teeth moving in a forward direction to project road surfacing material forwardly in the oil sprayed downwardly from the spray pipe.

21. A road oil mixer having a vehicle frame, a floating frame mounted thereon, a housing secured to part of the floating frame and having a top, sides, a back with an opening adjacent the ground and an opening in the front, a rotatable spool journalled in the sides of the housing, a plurality of individual mixing teeth on the spool positioned longitudinally and circumferentially thereof, an engine mounted on another part of the floating frame, a drive from the engine to the spool and means to raise, lower and laterally tilt the part of the floating frame with the housing and spool, a cutting and elevating blade extending transversely across the housing below the spool to cut road surfacing material from the road bed and to elevate said material to engage the teeth, the said spool being rotated with the lower teeth moving in a forward direction to project particles of the road surfacing material forwardly of the said blade.

22. The method of preparing materials for road paving compositions consisting in arranging the materials on the surface of a roadway in a pile extending longitudinally thereof, then moving material from the pile transversely over the road surface while simultaneously mixing and beating it, and while beating and while the materials are being moved transversely, mixed and beaten, injecting an oil binder into the material, whereby the material with the binder is simultaneously moved, mixed and beaten.

23. The method of preparing materials for road paving compositions, consisting in arranging the materials on the surface of a roadway in a pile extending longitudinally thereof, moving material from the pile transversely over the road surface and repeatedly picking up portions of the material and violently hurling them against the road surface in the course of their transverse movement, and while the materials are being moved transversely, repeatedly picked up and violently hurled against the road surface, injecting an oil binder into the material whereby portions of the material with the binder are repeatedly picked up and hurled violently against the road surface in the transverse movement of the material.

24. In the method of preparing materials with a binder of a hydrocarbon type for road paving compositions, that improvement which consists in violently mixing and beating the materials and at the same time injecting an oil binder into such materials, whereby the materials with the binder are violently mixed and beaten while moving said material on and over the road surface.

25. The method of preparing materials with a binder of a hydrocarbon type for road paving compositions, consisting in arranging the materials on the surface of a roadway in a pile extending longitudinally thereof, then mixing and beating the material in the pile while simultaneously injecting an oil binder therein, whereby the materials with the binder are mixed and beaten while simultaneously moving the material on and over the road surface.

26. The method of preparing materials with a binder of a hydrocarbon type for road paving compositions, consisting in arranging the materials on the surface of a roadway in a pile extending longitudinally thereof and repeatedly picking up portions of the material and violently hurling them against the road surface and simultaneously therewith injecting an oil binder in the materials whereby portions of the material with the binder are repeatedly picked up and violently hurled against the road surface while moving the material from the pile on and over the road surface.

27. In the method of preparing materials for road paving compositions, in which the materials are cut and elevated from the road subgrade without substantial agitation and are moved over the surface of the roadway by scraping small portions of the material in rapid sequence, that improvement which consists in violently mixing and beating the material as it is moved.

28. The method of preparing materials for road paving compositions, consisting in arranging the materials on the surface of a roadway in a pile extending longitudinally thereof, then cutting and elevating the materials from the road subgrade without substantial agitation and moving the material from the pile transversely over the road surface while simultaneously mixing and beating it.

29. The method of preparing materials for road paving compositions, consisting in arranging the materials on the surface of a roadway in a pile extending longitudinally thereof, cutting and elevating the materials from the road subgrade without substantial agitation, moving the material from the pile transversely over the road surface and repeatedly picking up portions of the material and violently hurling them against the road surface in the course of their transverse movement.

30. In the method of mixing road materials by a mixing machine moved progressively over solid aggregates arranged in a layer on the road and forming road surfacing material, comprising continuously and progressively picking up and projecting particles of the aggregate in a forward direction at a much higher velocity than the forward movement of the machine, forming a loose moving mass of agitated aggregates, such loose mass moving forwardly at the same rate as the machine, into the mass of the loose aggregates, introducing a liquid binder and causing the aggregates with the binder to have portions thereof picked up and violently projected forwardly, the aggregates with the binder undergoing a beating action and the aggregates with the binder from the loose mass having an upward overflowing and downwardly depositing action.

31. In the method of mixing road materials by a mixing machine moving in a forward direction over solid aggregates deposited in a layer on a road subgrade and forming road surfacing material, comprising cutting and elevating the aggregates from the road bed at the same speed as the forward progression of the machine and without substantial agitation, violently picking up and projecting portions of the material in a forward direction at a much higher velocity than that of the forward movement of the machine, thereby forming a loose mass of aggregates, such loose mass moving forwardly at the same speed as the movement of the machine and in such movement of the mass subjecting the particles thereof to a beating action causing the materials from the mass to build up to a sufficient height to flow upwardly and then downwardly, the particles being driven rearwardly to form a deposit on the road surface, the deposit progressing forwardly at the same speed as the forward movement of the machine.

32. In the method of mixing road materials as claimed in claim 31, injecting a liquid oil binder into the loose mass of aggregates and causing the particles of the aggregate with the liquid binder to be subjected to a violent beating action, the aggregates with the binder being deposited in a mixed condition.

33. In the method of mixing road surfacing materials, in which a road mixing machine having a rotating spool is progressively moved over solid aggregates on a road subgrade, the bottom of the spool being above the road subgrade, comprising progressively picking up and violently hurling portions of the aggregate from the road surface, such portions being projected forwardly at a higher rate of speed than the progressive movement of the spool, the road surfacing material being driven forwardly so that none of such material passes underneath the spool, building up a loose agitated mass of aggregates forward of the spool, such loose mass having a forward progressive movement at the same rate as that of the machine, and subjecting such mass to a violent beating action, causing the loose mass to build up to a height to overflow the top of the spool and violently hurling the particles rearwardly after such overflow to be again deposited.

34. In the method of mixing road surfacing materials as claimed in claim 33, cutting and elevating the materials from the road subgrade without substantial agitation prior to the action of hurling the particles of the aggregate forward, the rate of cutting and elevating being at the same speed as the forward movement of the machine.

35. In the method of mixing road surfacing materials as claimed in claim 33, cutting and elevating the materials from the road subgrade without substantial agitation prior to the action of hurling the particles of the aggregate forward, the rate of cutting and elevating being at the same speed as the forward movement of the machine, injecting a liquid binder into the loose mass of aggregates and subjecting particles of the aggregates with the binder to a violent beating action, portions of said aggregates with the binder being violently hurled forwardly, the aggregates with the binder overflowing the spool and being deposited in a mixed condition.

36. In the method of preparing road paving compositions in which a road mixing machine having a rotating spool is progressively moved over solid aggregates on a road subgrade, the bottom of the spool being above the subgrade, comprising progressively cutting and elevating the aggregates from the subgrade without substantial agitation, at the same speed as the forward progression of the mixer, progressively picking up and violently hurling portions of the aggregate so cut and elevated, in a forward direction at a much higher rate of speed than the forward progressive movement of the mixer, said portions being hurled forward beyond the position of cutting of the aggregates from the subgrade, the said cutting and forward projection being such that none of the aggregates pass underneath the spool, building up a loose agitated mass of aggregates forward of the spool, such mass as a whole having a forward progressive movement at the same rate as that of the machine, portions of the aggregates projected forwardly again being cut and elevated from the road subgrade and again subjected to a forward projection, the aggregates being subject to a violent beating action causing the loose mass to build up to a height to overflow the top of the spool and violently hurling the particles rearwardly after such overflow to be again deposited on the road subgrade, the progressive rate of deposition being the same as that of the forward movement of the machine.

37. In the method of preparing road paving compositions, as claimed in claim 36, forward of the position of cutting the aggregates from the subgrade injecting an oil binder into the loose agitated mass in front of the spool and subjecting portions of the aggregates with the binder to the forward projection and to a violent beating action, whereby the particles of the aggregate and the binder are deposited in the mixed condition.

38. In the method of preparing road paving compositions in which a mixing machine having a rotating spool is progressively moved over a layer of aggregates forming road surfacing material on a road subgrade, the bottom of the spool being above the subgrade, the spool being rotated with the bottom portion of the spool moving in a forward direction, comprising progressively picking up and violently hurling a multitude of individual portions of the aggregate in a forward direction at a much higher velocity than the forward movement of the machine, said particles being projected into the air forward of the spool and again falling on the undisturbed aggregates to be again progressively picked up and violently hurled forward, thereby forming a loose mass of aggregates in front of the spool, such mass being subjected to a violent beating action, the said mass having a general direction of rotation counter to that of the spool and said mass as a whole moving forwardly at the same rate as the forward movement of the machine.

39. In the method of preparing road paving compositions as claimed in claim 38, building up the loose mass of aggregates to such a height that the aggregates overflow the top of the spool and substantially none of the aggregates pass underneath the bottom of the spool, and violently projecting the aggregates overflowing the spool rearwardly to be deposited on the road subgrade, the progressive rate of deposition being the same as the forward speed of the machine.

40. In the method of preparing road paving compositions in which a mixing machine having a rotating spool is progressively moved in a forward direction over the aggregates on a road subgrade, such aggregates forming a road paving composition, the bottom of the spool being above the subgrade and being rotated in a forward direction, comprising progressively cutting into and elevating the aggregates from the subgrade without substantial agitation at the same speed as the forward progression of the mixer, progressively picking up and violently hurling a multitude of individual portions of the aggregates into the air forward of the spool to fall on the undisturbed aggregates, portions of the projected aggregates being again picked up and violently projected forwardly, thereby forming a loose mass of aggregates forward of the spool, subjecting such mass to a violent beating action, said mass having a general direction of rotation counter to that of the spool and said mass as a whole having a forward progressive movement at the same rate as that of the mixer, and again depositing the aggregates rearwardly of the spool.

41. In the method of preparing road paving compositions as claimed in claim 40, injecting an oil binder into the loose mass of aggregates, whereby portions of the aggregates with an oil binder are subjected to the progressive picking up and violent forwardly hurling action, building up the loose mass of aggregates with the oil binder incorporated therein to a sufficient height to overflow the top of the spool and subjecting the loose mass of aggregates with the binder to a violent beating action, then violently projecting the aggregates with the oil binder rearwardly from the top of the spool to be again deposited on the road subgrade.

42. In a road oil mixer, a vehicle, a transversely positioned mixing spool having individual radially extending mixing teeth, the individual teeth being positioned longitudinally and circumferentially spaced apart on the spool, the bottom of the spool being above a road subgrade on which there may be a layer of aggregates to form a road paving composition, said vehicle being adapted to be moved over the layer of aggregates, means to rotate the spool with the lower teeth moving in a forward direction at a much higher velocity than the forward movement of the vehicle, the forwardly moving lower teeth of the spool being adapted to project the aggregates in a multitude of small portions forwardly into the air forward of the spool a sufficient distance whereby a large proportion of the projected aggregates may again fall on the undisturbed layer of aggregates, an oil spray pipe positioned forward of the spool and above the layer of undisturbed aggregates to inject oil into the forwardly projected aggregates.

43. In a road oil mixer as claimed in claim 42, a cutting and elevating blade adjustably mounted in relation to the spool to cut the aggregates from the road subgrade and to elevate said aggregates without substantial agitation to the lower forwardly moving teeth of the spool, the teeth being so spaced and rotated at such a velocity that substantially none of the aggregates flow underneath the spool, the rotating teeth of the spool being adapted to build up a loose mass of aggregates forward of the spool without positive elevation by the teeth to cause the aggregates to overflow the top of the spool, the spool being driven at such a velocity that the overflowing aggregates are violently hurled rearwardly of the spool to be again deposited on the road subgrade.

44. A road oil mixer having a vehicle frame, a floating frame mounted thereon having a mixing spool with mixing teeth thereon, means to rotate the spool whereby when the vehicle is moved in a forward direction the teeth on the lower portion of the spool may engage a road paving composition on the road and violently move the composition away from the spool, means to shift the axis of the spool in reference to the longitudinal axis of the vehicle, whereby the axis of the spool may form variable angles to the axis of the vehicle and therefore being adapted to move the composition from the road sidewise in reference to the direction of forward movement of the vehicle.

45. A road oil mixer as claimed in claim 44, the floating frame having a cutting and elevating blade located substantially below the axis of the spool and adapted to cut and elevate the paving composition from a road subgrade to the teeth of the spool, the cutting and elevating blade being shiftable with the spool at an angle to the axis of the vehicle.

46. In a road oil mixer, a vehicle, a floating frame in said vehicle, a rotatable spool mounted in said frame, said spool having individual mixing teeth spaced longitudinally and circumferentially one from another, a cutting and elevating blade positioned in said frame below the spool, means to rotate the spool, means to turn the floating frame on a vertical axis whereby the axis of the spool and the cutting blade may be shifted to an angle in reference to the axis of the vehicle, and means to turn the floating frame on a longitudinal axis whereby the spool and the cutting blade may be moved to accommodate a camber of a road surface.

47. In a road oil mixer as claimed in claim 46, an oil spray pipe secured to the floating frame on one side of the spool and adapted to inject oil into material forcibly driven by the rotating teeth from the road surface.

48. In a road oil mixer, a vehicle frame, a floating frame pivotally connected to the forward end of the vehicle frame and having an engine thereon adjacent the pivot, a mixing spool with mixing teeth suspended from the floating frame, a drive from the engine to the spool, and means at the rear end of the vehicle frame to laterally shift the rear end of the floating frame to change the angle of inclination of the spool sidewise in reference to the direction of travel of the vehicle, means operative from the rear of the vehicle to raise and lower the rear portion of the floating frame with the spool, and to tilt upwardly one side of said frame and spool with the engine with reference to the vehicle frame.

49. In a road oil mixer, a vehicle frame connected between front and rear wheels, a floating frame pivotally mounted on the vehicle frame, a mixing spool having radially extending mixing teeth suspended from the floating frame between the front and rear vehicle wheels and extending transversely across the floating frame, an engine on the floating frame, a drive connection from the engine to the spool to rotate the teeth engaging the road surfacing material in a forward direction to project material forwardly, a platform, means operative from said platform to raise, lower, or laterally tilt the floating frame and the spool while the mixer progresses over the ground, an oil spray pipe positioned forwardly of and above the spool and extending transversely across the floating frame, and means carried by the floating frame to meter oil discharge through said spray pipe.

50. A road oil mixer comprising a vehicle having a rotatable spool with a plurality of individual mixing teeth positioned longitudinally thereof and circumferentially adjacent teeth being offset laterally to form a helix around the spool, said spool being mounted transversely of the vehicle, means to rotate the spool with the lower teeth moving in a forward direction to project particles of road surfacing material forwardly and to shift such material laterally, and an oil spray pipe positioned above and forward of the spool and substantially parallel to the axis of the spool to discharge oil into the material projected forwardly and when shifted laterally, cutting and elevating means positioned transversely of the vehicle below the spool to cut road surfacing material from the road bed and to elevate said material to directly engage the teeth, the said teeth projecting particles of the road surfacing material forwardly above the cutting and elevating means to deposit said material on the road surfacing material to be again elevated and again projected forwardly.

51. In the method of preparing materials for road paving compositions in which the materials are moved over the surface of a roadway by scraping small portions of the material in a rapid sequence, that improvement which consists in violently mixing and beating the material as it is moved and at the same time injecting an oil binder into the material as it undergoes mixing, beating and moving thereby simultaneously mixing, beating and moving the material and the binder.

52. A road oil mixer having a vehicle with a vehicle frame, a spool mounted in said frame with its axis transverse to the direction of forward movement of the vehicle, the said spool having a plurality of individual mixing teeth spaced circumferentially one from another around the spool and lengthwise thereof, a wear plate secured to the outer end of each tooth, each wear plate having its face positioned at an angle to the axis of the spool, means to rotate the spool with the lower ends of the teeth and the lowermost wear plates moving in a forward direction whereby the wear plates in succession scrape small portions of road surfacing material in a rapid sequence forwardly and laterally relative to the forward movement of the vehicle, and means to raise, lower and laterally tilt the spool in reference to the vehicle frame.

53. A road oil mixer as claimed in claim 52, a connection between the spool and the frame for inclining the axis of the spool at an angle to the longitudinal axis of the vehicle to vary the relation of the forward and lateral scraping of the material.

54. A road oil mixer comprising in combination a vehicle frame adapted for forward movement over a road, a pair of spools mounted in the frame, the spools being located one behind the other with their axes parallel, each spool having a plurality of radially extending mixing teeth, the teeth of each spool spaced circumferentially and longitudinally of the spool, means to simultaneously rotate both spools whereby the lowermost teeth move forwardly and engage road surfacing material, the spools being driven at such a rate that the teeth of each spool drive the material acted upon in a forward direction, building up a loose mass of material forward of such spool to overflow rearwardly over the top of the spool, the rearwardmost spool directing the material acted upon forwardly towards the material overflowing from the forward spool.

55. In a method of preparing materials for road paving compositions consisting in arranging the materials on the surface of the roadway, then in a continuous movement longitudinally of the road, cutting into and removing at least a part of the layer material from the road surface, and in the same action of cutting into and removing driving the aggregates in loose agitated condition forwardly and at the same time laterally of the road surface thereby building up a mass of loose agitated aggregates which have a movement lateral of the road and then depositing the material in a rearward direction and shifted laterally from their initial position on the road surface.

56. In a method of preparing materials for road paving compositions, consisting in arranging materials on the surface of a roadway in a pile extending longitudinally thereof, causing a mixing spool to be moved progressively in a forward direction over the road surface in a movement of translation, longitudinally cutting and removing at least a part of the pile of material from the road surface and in the same action of cutting into and removing driving the aggregates in a loose agitated condition forwardly of the spool and also in a direction transverse to the road, causing the building up of a loose mass of agitated aggregates forward of the spool and causing the agitated road materials to pass rearwardly over the top of the spool and to be again deposited rearwardly of the spool on the road surface in a position laterally displaced from that of the initial pile.

57. In the method of mixing road materials in which the solid aggregates and a liquid binder to be mixed are spread on the road surface and in which a rotatable spool having individual mixing teeth spaced circumferentially in a helix and also longitudinally on the spool one from another, is moved progressively in a forward direction over the road surface in a movement of translation and with the teeth engaging the material on the road surface moving rapidly in a forward direction at a much higher rate of speed than that of the movement of translation of the spool, comprising, longitudinally cutting into and removing at least a part of the layer materials from the road surface and in the same action of cutting into and removing driving the aggregates in a loose agitated condition forward of the spool and also laterally from their initial position, further causing particles of the aggregates to be reengaged by the teeth and again driven forward of the spool thereby developing a loose mass of aggregates having a circular rotation in a counter direction to that of the rotation of the spool, building a loose mass of aggregates forward of the spool to a sufficient height to flow aggregates rearwardly over the top of the spool and depositing the aggregates on the road surface rearwardly of the spool and spaced laterally from their initial position on the road surface.

58. In a road oil mixer, a vehicle frame with a spool having a plurality of individual mixing teeth spaced one from the other circumferentially of the spool in a line forming a helix, means to rotate the spool so that the mixing teeth when engaging road material on the road surface move rapidly in the forward direction of movement of the spool whereby said teeth cut into and project the road material forwardly of the spool and at the same time laterally, and means to raise and lower the spool relative to the vehicle frame.

59. In a road oil mixer as claimed in claim 58, the teeth arranged in the circumferential helix forming a helix of a steep slope, said teeth also being spaced longitudinally of the spool forming a second helix of a gradual slope whereby only a portion of the teeth on the spool at a time engage the road surface, said raising and lowering means being operative to laterally tilt the spool relative to the vehicle frame to thereby regulate the position of the teeth to the transverse slope of a road surface.

60. In a road oil mixer, a vehicle frame, a spool mounted thereon, said spool having a plurality of individual radially extending mixing teeth, said teeth being positioned circumferentially around the spool in a line forming a helix of steep slope, the teeth also being arranged offset one from the other considered longitudinally of the spool whereby only a few of the teeth at the bottom portion of the spool engage the road material at one time, said spool being rotated rapidly with the teeth at the bottom of the spool moving in the same forward direction as the forward movement of the vehicle but at a much higher speed, means to raise, lower and laterally tilt the spool relative to the vehicle frame, the teeth being adapted to longitudinally cut material from the road surface and to project said material forwardly to form a mass of loose aggregates which, when accumulated to a sufficient height, overflow over the top of the spool rearwardly, the teeth having a sufficient velocity to impel such overflow material rearwardly, the helical positioning of the teeth being operative to transfer material longitudinally of the spool.

GEORGE GARDNER.